United States Patent [19]
Bender

[11] Patent Number: 5,459,351
[45] Date of Patent: Oct. 17, 1995

[54] APPARATUS FOR MOUNTING AN ABSOLUTE PRESSURE SENSOR

[75] Inventor: Terrence D. Bender, Hamel, Minn.

[73] Assignee: Honeywell Inc., Minneapolis, Minn.

[21] Appl. No.: 267,634

[22] Filed: Jun. 29, 1994

[51] Int. Cl.⁶ .......................... H01L 29/84; H01L 29/96
[52] U.S. Cl. ............... 257/417; 257/418; 257/419; 257/420; 73/720; 73/721; 73/726; 73/727
[58] Field of Search ..................... 257/415, 417, 257/418, 419, 420, 793, 704, 710; 73/708, 726, 756, 718, 727, 716, 720, 721

[56] References Cited

U.S. PATENT DOCUMENTS

| | | | |
|---|---|---|---|
| 4,838,089 | 6/1989 | Okada et al. | 73/727 |
| 5,029,478 | 7/1991 | Wamstad | 73/708 X |
| 5,097,841 | 3/1992 | Moriuchi et al. | 73/708 X |
| 5,257,547 | 11/1993 | Boyer | 73/756 |

FOREIGN PATENT DOCUMENTS

| | | |
|---|---|---|
| 57-100038 | 10/1982 | Japan . |
| 58-168930 | 10/1983 | Japan . |
| 62-203381 | 9/1987 | Japan . |

Primary Examiner—William Mintel
Attorney, Agent, or Firm—Gregory A. Bruns

[57] ABSTRACT

An absolute pressure sensor subassembly includes a top cap bonded to a pressure sensor die and enclosing a reference vacuum. The subassembly is initially held in place within a housing by a vacuum or sublimeable solid adhesive while wire bonds from the subassembly to the housing leads are completed. A self-contained adhesive drop on the inner surface of the housing cover contacts the sensor subassembly when the cover is placed on the housing body and the sensor subassembly is supported by the adhesive drop.

16 Claims, 7 Drawing Sheets

APPARATUS FOR MOUNTING AN ABSOLUTE PRESSURE SENSOR

BACKGROUND OF THE INVENTION

The present invention is directed toward solving the problem of stress related to the packaging configuration for a diaphragm-type absolute pressure sensor which includes a vacuum reference.

The prior art is descriptive of a silicon based absolute sensor structure which employs implantable semiconductor strain sensitive resistors (utilizing the commonly referred to piezoresistive effect), a stress isolating structure, for example, a Pyrex tube to which the silicon pressure die is anodically bonded, and a vacuum reference, which is made during encapsulation of the sensor within the sensor package. The vacuum reference is maintained over time by the use of a discrete getter attached to the cover of the sensor package and "activated" during the encapsulation process. The package provides the mechanical pressure port interconnect between the strain sensor and the outside world and the electrical interconnect between the silicon piezoresistors (strain resistors) on the silicon die and the outside world.

The strain sensitive piezoresistors are arranged on the silicon die and typically interconnected so as to form a full Wheatstone bridge on one surface. The underside of the silicon die is usually etched to form a thin diaphragm, in this case circular. The edges of the diaphragm correspond to the location of the piezoresistors, where strain is the greatest when the diaphragm undergoes bending as a result of pressure loading on one side. The desired sensitive axis is perpendicular to the diaphragm.

Since the sensor is also sensitive to package induced strain effects, a mechanical strain isolator must be employed to maintain pressure sensitivity selectivity. A Pyrex tube or washer, or a secondary and/or tertiary silicon strain isolation chip is often employed between the sensor and package.

The absolute pressure sensor accuracy over time and temperature is a function of the quality of the vacuum. The lower and more stable the vacuum, the better the accuracy and repeatability of the transducer over time. The vacuum is established during package cover seal at which time a getter is installed and activated. The cover is usually sealed by laser welding in a vacuum.

The attachment of the sensor die (chip) to the Pyrex tube, insertion of the chip/tube into the package, and vacuum processing of the package is done in discrete steps, which are labor intensive and therefore expensive.

Thus, a need exists for a reduced-cost apparatus for isolating a diaphragm-type absolute pressure sensor from the stress introduced by the sensor package.

SUMMARY OF THE INVENTION

The present invention solves these and other needs by providing a stress-isolating apparatus for mounting an absolute pressure sensor having a self-contained vacuum reference, including a housing surrounding a cavity with the cavity having opposing and having a pressure port. In one embodiment, a vacuum is pulled on the pressure port to hold the pressure sensor against the pressure port while wire bonds are made from the pressure sensor to the internal leads of the package. Alternatively a sublimeable adhesive may be used to hold the pressure sensor to the housing during wirebond. A drop of adhesive is then placed on the central portion of the housing cover and when the cover is received on the housing base, the adhesive contacts the pressure sensor. As the adhesive cures, it moves the pressure sensor so that it is spaced from the housing and is supported only by the adhesive.

DETAILED DESCRIPTION OF THE INVENTION

Figure 1:
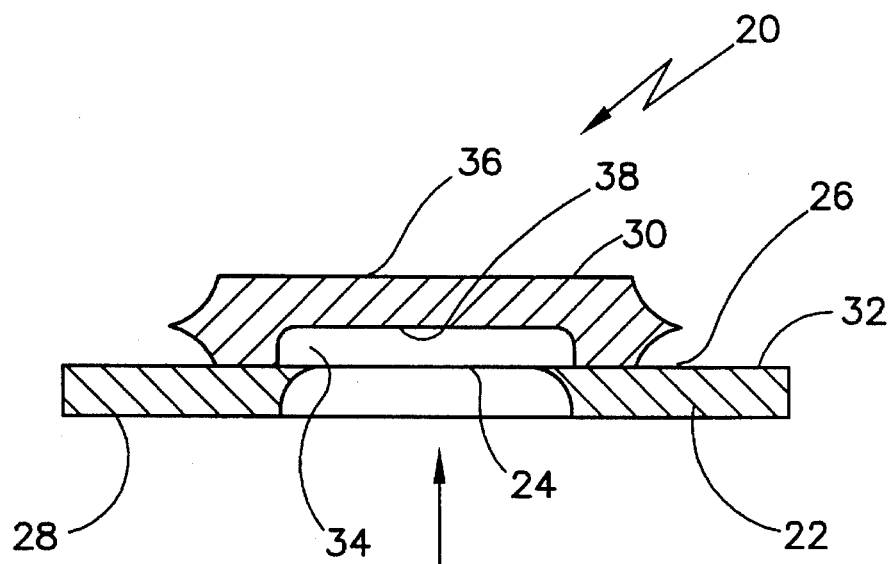
FIG. 1 is a sectional drawing of an absolute pressure sensor subassembly.

An apparatus for mounting an absolute pressure sensor including a self-contained vacuum reference within a housing is shown in the drawings and is generally designated 10. A general description of the wafer level processes to provide pressure sensor die 20 will be provided now.

To start with, the aforementioned vacuum processing, formerly done at the packaging level, is now proposed to be performed at the wafer level, before wafer saw, where the vacuum reference is now considered part of the sensor die structure. The vacuum would be encapsulated by bonding within a vacuum a secondary wafer of silicon or another suitable material to the top of a sensor wafer. FIG. 1 shows the resulting sensor subassembly or sensor die 20 which includes a lower portion or base 22 having a thinned central diaphragm 24 and vacuum capsule or top cap 30 which is bonded to base 22. Base 22 has an upper surface 26 and a lower surface 28 and top cap 30 is bonded to upper surface 26. Upper surface 26 also includes bonding pads 32. Vacuum cavities 34 would be formed in the top cap wafer corresponding in position to the diaphragms 24 in the sensor wafer. Top cap 30 has top surface 36. The aforementioned getter used in the past would be replaced by a suitable getter material 38 sputtered to the inside of the vacuum cavity wafer prior to attachment to the sensor wafer. The bonding of the two wafers in a vacuum would be performed using standard anodic techniques or glass reflow techniques currently in practice. These require first the sputtering of thin film soft glasses, or anodically bonded thick film glasses on the vacuum cavity wafer that act as the adhesive layer, binding the two wafers together. The bonding itself requires heat, which serves to activate the getter by driving off adsorbed gases. The "clean" getter surface is now prepared to adsorb gases released over time by the sensor material in the encapsulated vacuum cavity 34. While the vacuum encapsulation process has been described with reference to bonding a secondary silicon wafer, it is not limited to this. For example, Pyrex or glass, or other materials having thermal expansion properties that match closely with silicon may be used. For example, materials such as sapphire or ruby may be used. The material to be used must be amenable to etching. One material having suitable properties is a glass identified as HOYA SD-2.

Figure 2:
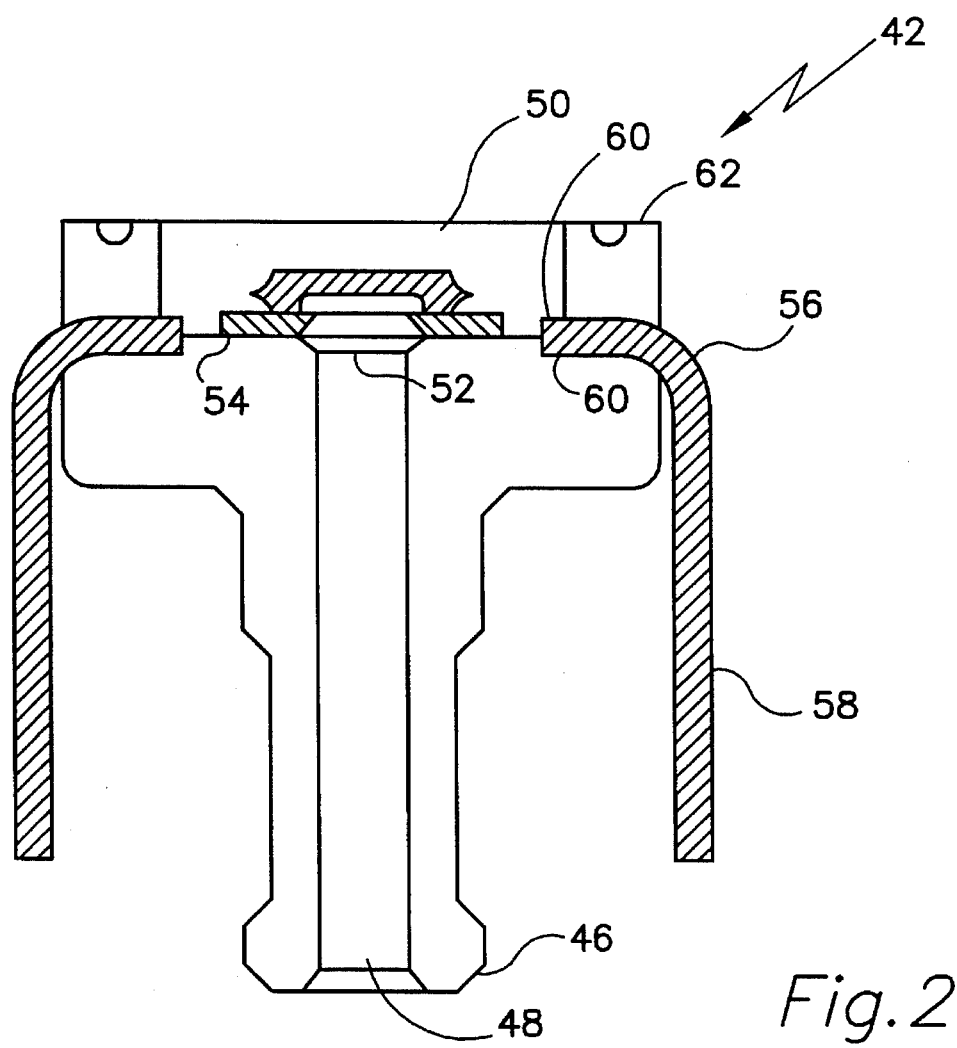
FIGS. 2–6 are sectional drawings illustrating an apparatus in accordance with the present invention for mounting the absolute pressure sensor of FIG. 1.

Housing 40 includes body 42 and cover 44. Body 42 as shown in FIG. 2 has a pressure connection 46, a passage 48 in which the pressure to be measured is present, and a chamber 50. Pressure port 52 is within chamber 50 and is surrounded by surface 54. Pressure port 52 makes the pressure to be measured available within cavity or chamber 50. Leads 56 extend through body 42 and have external end portions 58 and internal end portions 60. Body 42 includes peripheral surface 62.

Figure 4:
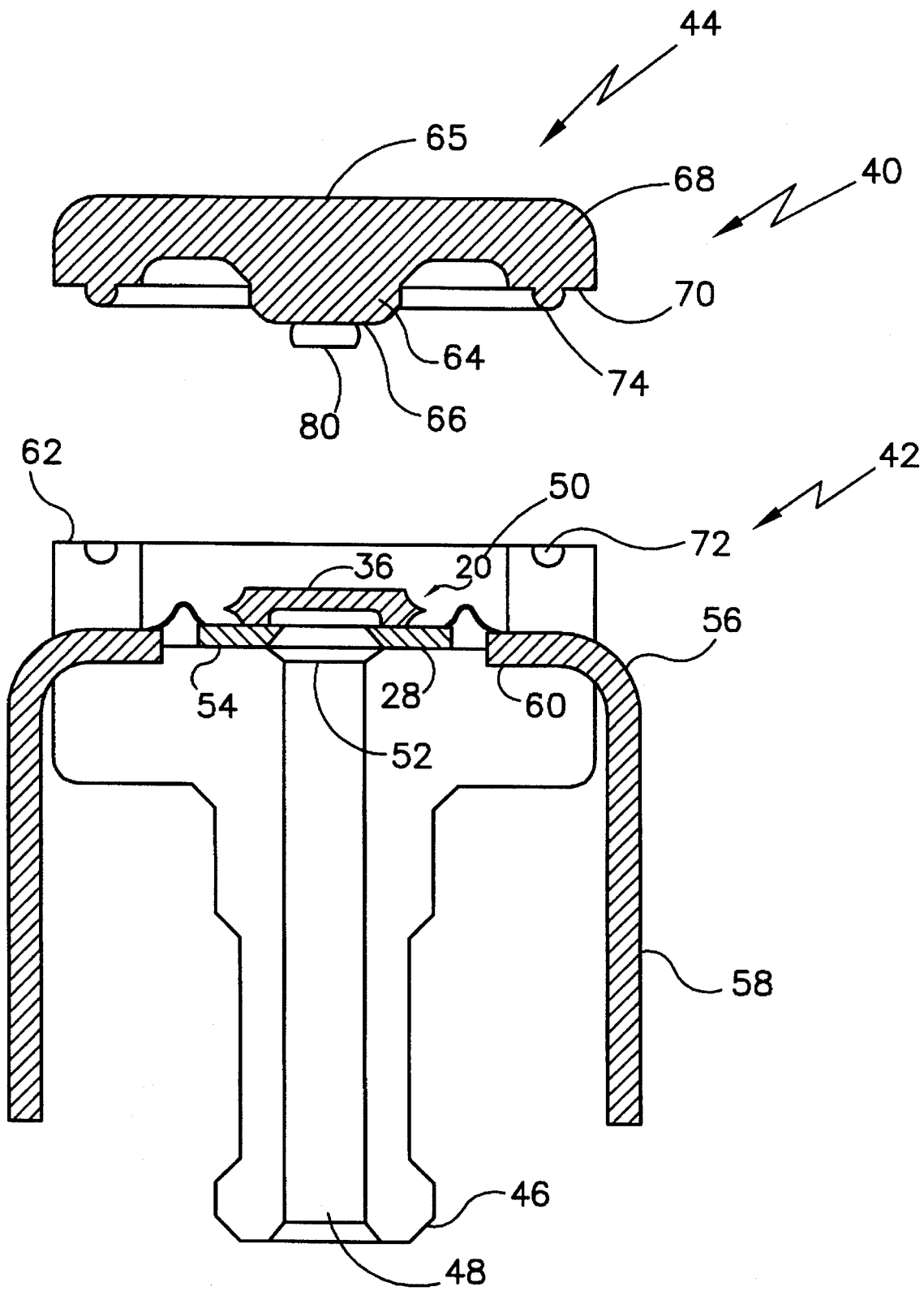

Cover 44 as shown in FIG. 4 has a central portion 65 including central surface 66 and a peripheral portion 68 including surface 70. Surface 62 of body 42 is configured for complementary receipt of surface 70 of cover 44. For example, by providing recess 72 in surface 62 and protrusion 74 in surface 70.

Figure 3:
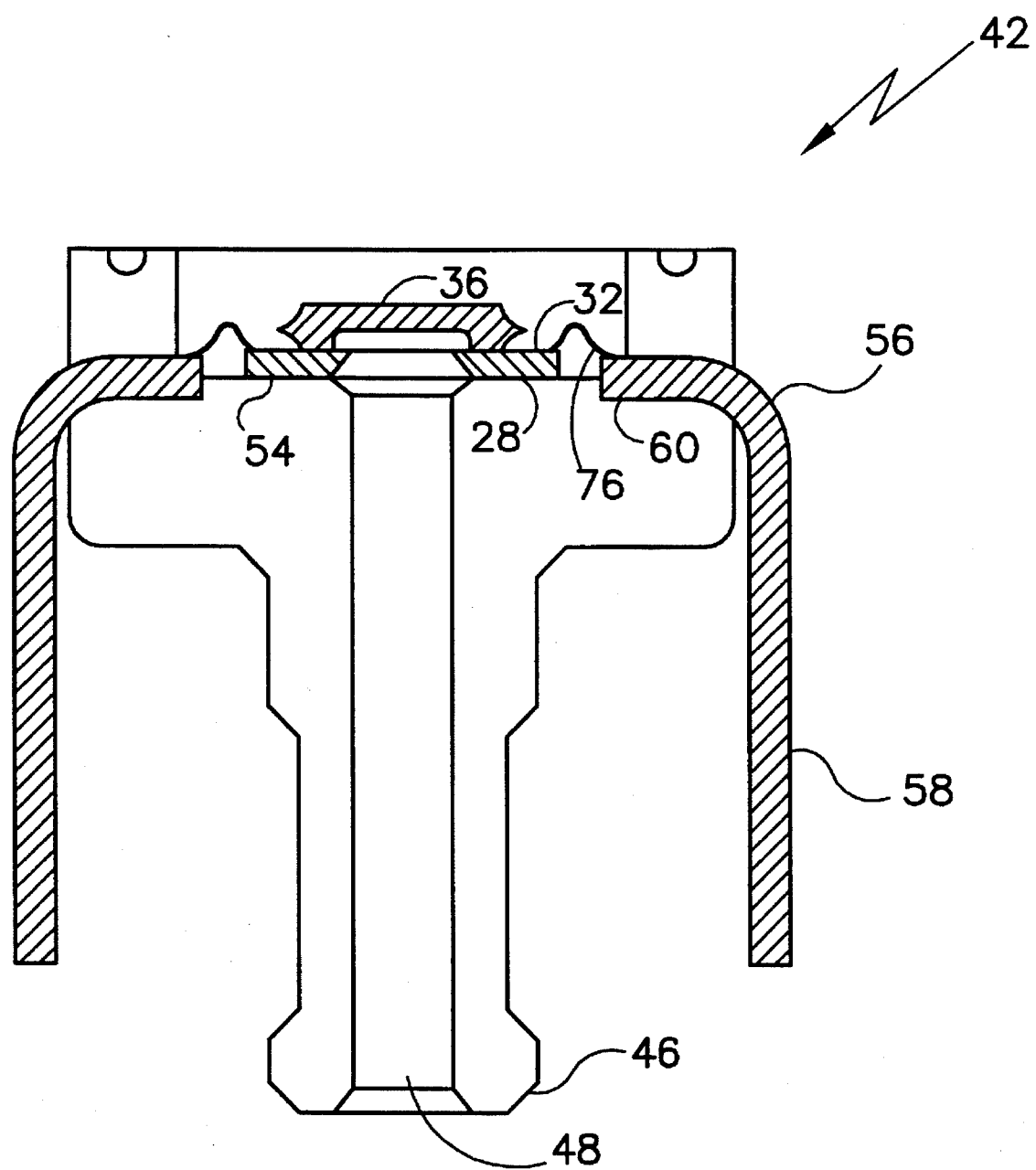

After batch fabrication of the silicon sensor and vacuum capsule has been completed and the wafer sandwich has been sawed into discrete sensor subassemblies they are now ready for the next step, wire bonding. Sensor subassembly 20 is placed on body member 42 with its diaphragm 24 directly above pressure port 52 and clamped firmly in place by pulling a vacuum on pressure connection 46. Wire bonding performed in the usual known way results in wire bonds 76 as shown in connecting bonding in FIG. 3 pads 32 and internal leads 60. After completion of wire bonds 76, the vacuum is released allowing sensor subassembly 20 to "float" held in place only by wire bonds 76. Alternatively, sensor subassembly 20 could be held in place during wire bonding by using a sublimeable adhesive.

Figure 5:
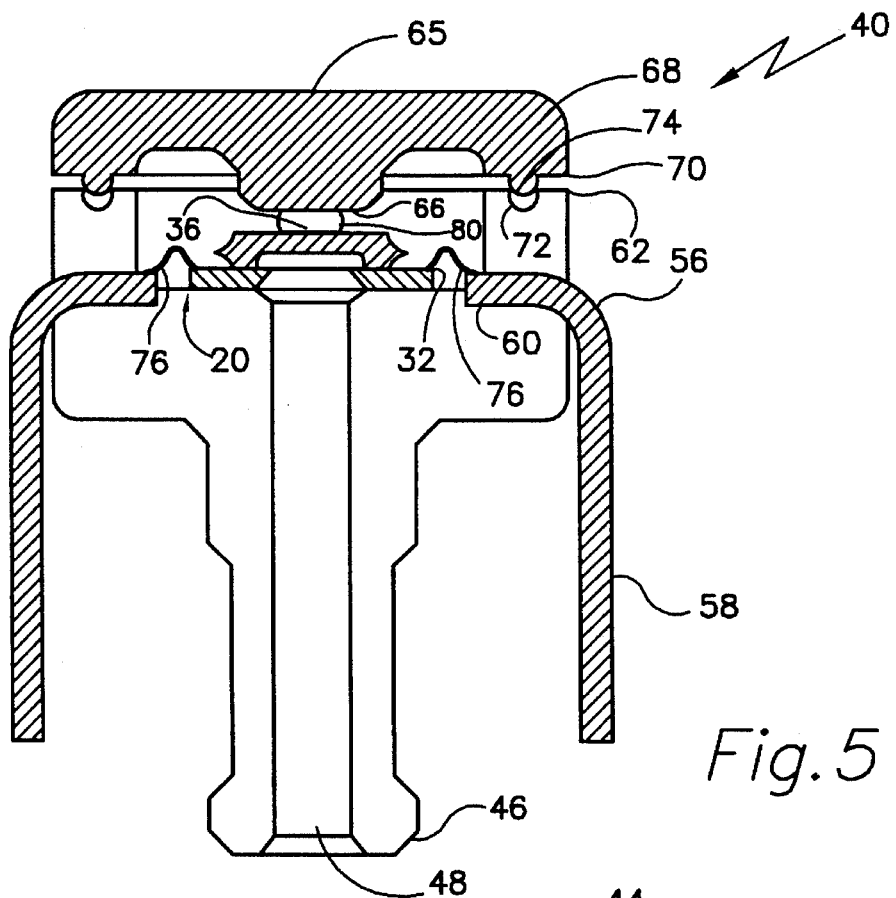
Figure 6:
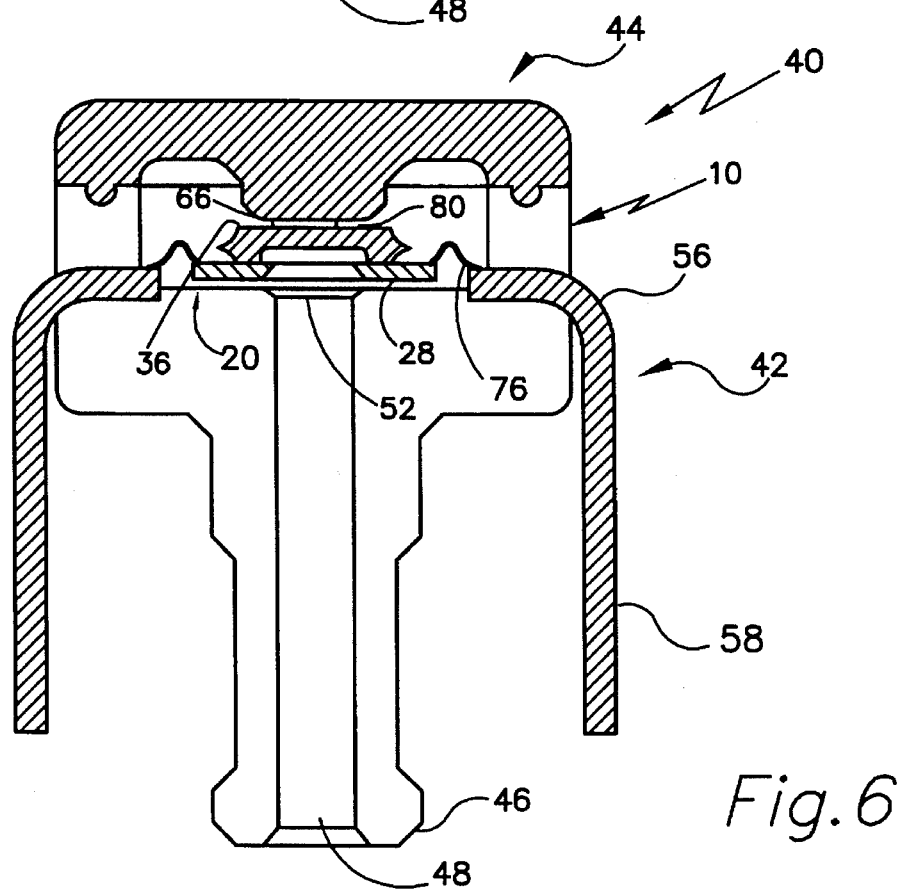

Next, cover 44 is prepared with a drop of adhesive 80 on central surface 66, as shown in FIG. 4. Adhesive drop 80 should be relatively inviscid, perhaps elastomeric, and have good wetting as well as high surface tension characteristics. It should shrink during cure. An example of a satisfactory adhesive material is Ablestik Laboratories, Rely-Imide 72254. The adhesive can be loaded with ceramic powders to alter the amount of shrinkage during cure. The shape of adhesive drop 80 is variable, as is the volume, to adjust the amount of lift-back. As Cover 44 is lowered onto body 42 as shown in FIG. 5 adhesive drop 80 contacts sensor subassembly 20 at top surface 36. During cure, adhesive drop 80 shrinks pulling sensor assembly 20 toward cover 44 and off of surface 54 where it was resting, exposing pressure port 52 to chamber 50. Adhesive drop 80 is located between fixed surface 66 and top surface 36. As curing occurs the contracting of adhesive drop 80 moves sensor subassembly 20 in a direction toward surface 66. When the curing process is completed, lower surface 28 will be in a position spaced from pressure port 52 and the pressure to be measured will be within chamber 50. Sensor subassembly 20 will then be supported by wire bonds 76 and adhesive drop 80 as shown in FIG. 6 and will be stress isolated from housing 40.

Figure 7:
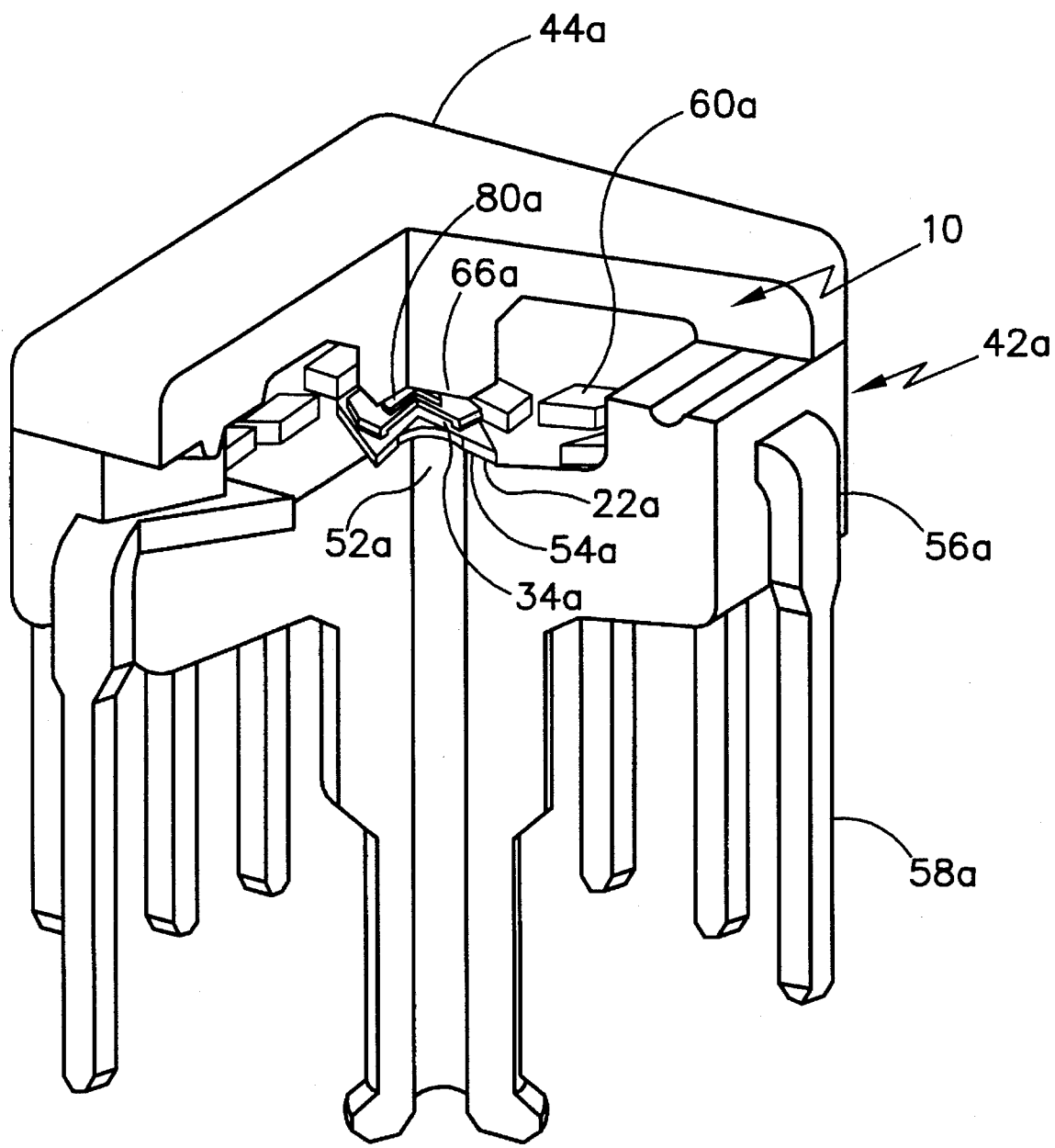
FIG. 7 is a first alternate embodiment of the present invention.

FIG. 7 is a first alternate embodiment of the apparatus 10, using plastic as the packaging material. FIG. 7 shows header or body 42a with leads 56a extending through header 42a internal end portions 60a and external lead portions 58a. Pressure sensor subassembly or die 22a includes vacuum reference cavity 34a. Header 42a includes a surface 54a surrounding pressure port 52a. Cover 44a includes a central surface 66a where adhesive drop 80a is placed and cover 44a is complementarily received on header 42a. Cover 44a can be ultrasonically or chemically bonded to header 42a.

Figure 8:
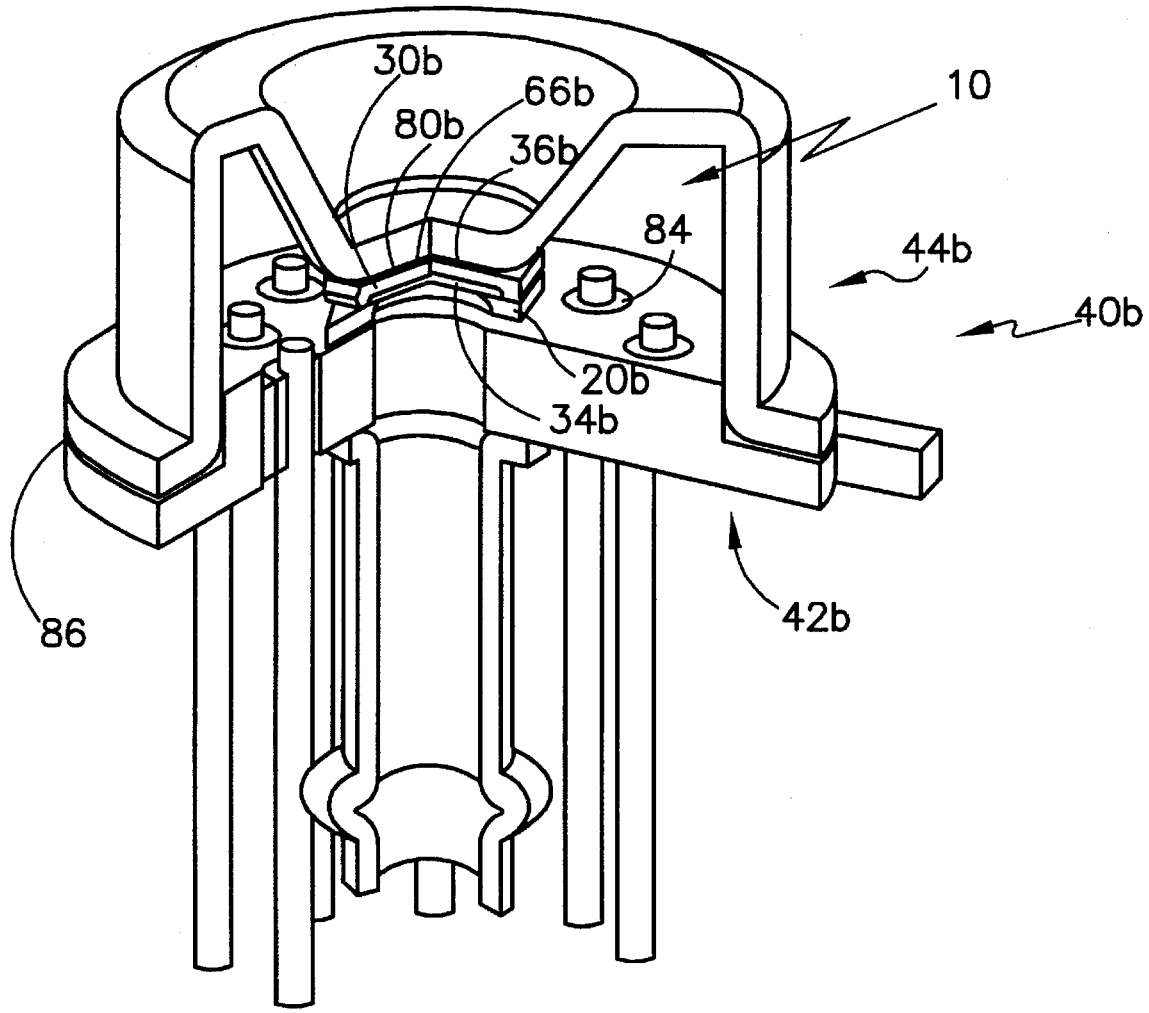
FIG. 8 is a second alternate embodiment of the present invention.

FIG. 8 is a second alternate embodiment using a commonly available TO-type housing or metal package 40b with glass-metal electrical feedthroughs 84. Where the attachment method of cover 44b to body 42b at 86 can be either metal-metal welding or epoxy adhesive type. FIG. 8 shows sensor subassembly 20b having vacuum cavity 34b and top cap 30b having a top cap top surface 36b. Adhesive drop 80b is located between cover central surface 66b and top surface 36b.

Figure 9:
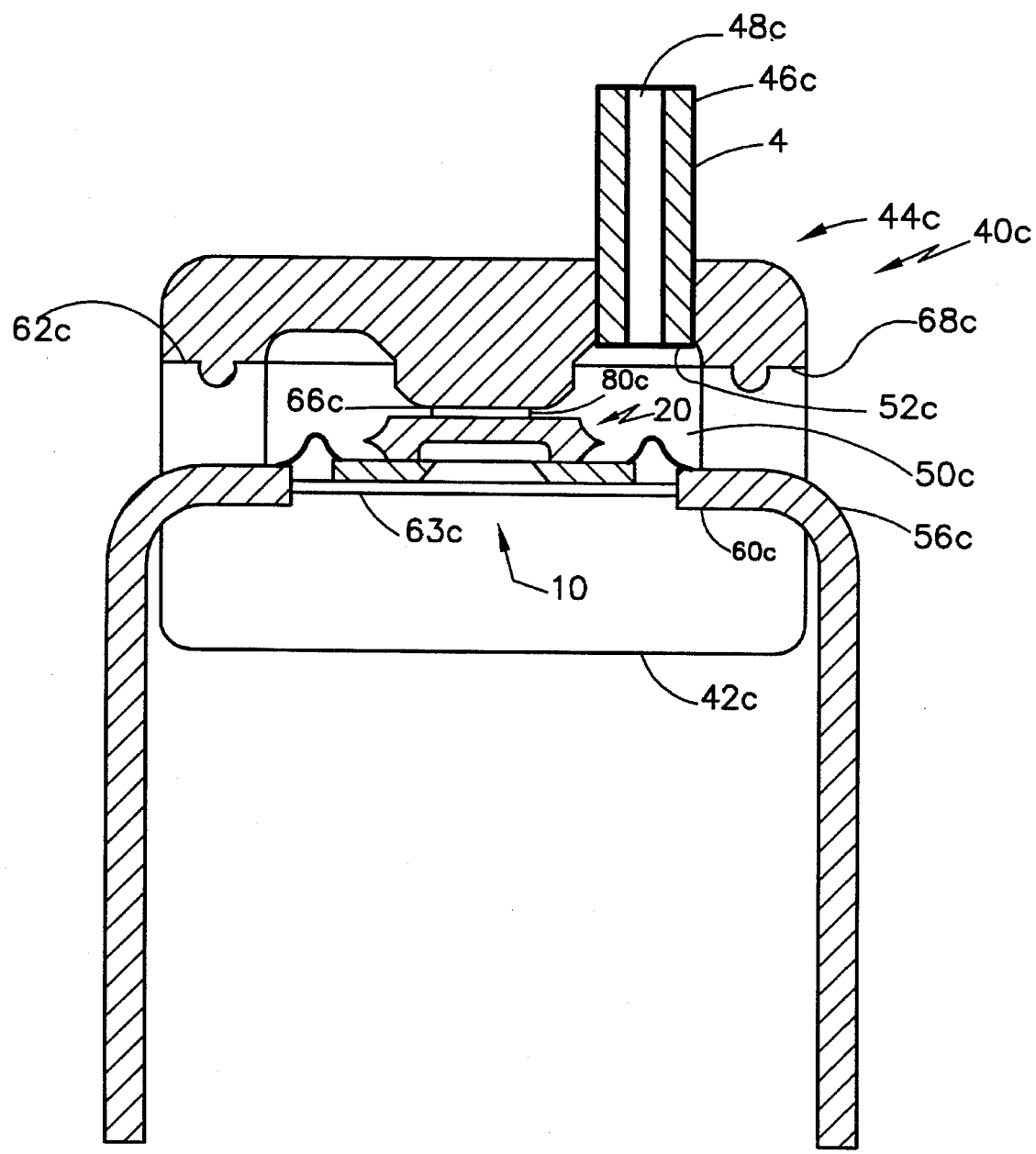
FIG. 9 is a third alternate embodiment of the present invention.

FIG. 9 is a third alternate embodiment of the apparatus 10. Sensor subassembly 20 is of the same construction as in the other embodiments. Housing 40c includes a body 42c and a cover 44c. A pressure connection 46c to a passageway 48c extends through cover 44c into chamber 50c at pressure port 52c. Leads 56c have internal lead portions 60c. Body 42c includes a peripheral surface 62c and a central surface 63c. Cover 44c includes a peripheral surface 68c and a central surface 66c. FIG. 9 illustrates that the pressure port may be located in the cover as well as in the base. Thus, the first and second alternate embodiments could also have a pressure port in the cover. It is only necessary that a passageway for an external pressure extend into the cavity.

Now that the construction and operation of apparatus have been set forth, certain advantages can be explained and appreciated. The expensive vacuum processing which in the past was done at the time that the sensor die was placed in the housing is no longer necessary because the vacuum reference is on chip. The present invention simplifies the design by combining the vacuum encapsulation chip function and the packaging strain isolation function into one sensor subassembly 20, and assembling it in a few steps, amenable to automation, into an inexpensive nonhermetic package.

Apparatus 10 provides mounting of sensor subassembly 20 with low package induced strain due to the small bond area between top cap 30 and base 22 of subassembly 20 and the small bond area between adhesive drop 80 and top cap 30.

Also, the need for a hermetic package is obviated because the sensor subassembly is the hermetic element. Therefore, lower cost plastic packages and packaging epoxies which were precluded in the past because of high outgassing levels may now be used.

In addition, the mounting apparatus 10 requires only low cost, low precision, discrete assembly operations which are amenable to automated assembly.

I claim:

1. Apparatus for mounting an absolute pressure sensor subassembly having a self-contained vacuum reference within a housing, comprising:

said pressure sensor subassembly comprising a base having a first side, a second side and a central diaphragm with a top cap enclosing said vacuum reference at said central diaphragm and bonded to said first side;

said housing having a cavity having a first surface and a second surface opposite said first surface;

a plurality of leads extending from inside said cavity to outside said cavity;

a passageway extending from inside said cavity to outside said cavity;

electrical connection means between said sensor and said leads; and a self contained adhesive means located between said first surface and said top cap, said adhesive means resiliently holding said pressure sensor subassembly with said second side being unattached at said first surface.

2. Apparatus of claim 1 wherein said second side is spaced from said first surface.

3. Apparatus of claim 2 wherein said adhesive means is a drop of material which has a first volume when applied and a second smaller volume after curing.

4. Apparatus of claim 3 wherein said drop has a shape and said shape and said first volume are related to said spacing of said second side from said first surface.

5. Apparatus of claim 3 wherein said housing comprises a first portion having said first surface and a second portion having said second surface and said second portion is for complementary receipt on said first portion.

6. Apparatus of claim 5 further comprising means for holding said sensor subassembly in place while said electrical interconnection means are made.

7. Apparatus of claim 6 wherein said means for holding comprises sublimeable adhesive means between said first surface and said second side of said sensor subassembly.

8. Apparatus of claim 6 wherein said second portion includes said passageway.

9. Apparatus of claim 6 wherein said first portion includes said passageway at said first surface, said electrical connection means comprises wire bond means and a vacuum is applied to said passageway to hold said sensor subassembly in place while making said wire bond means.

10. Apparatus for mounting an absolute pressure sensor subassembly having a self-contained vacuum reference, comprising:

a housing having a passageway for connection to an external pressure, said housing comprising a base and a cap, said base having a peripheral portion and a central portion, said cap having a central portion and a peripheral portion, said cap for complimentary receipt on said base;

a plurality of conductive leads extending through said package, said leads having a plurality of internal end portions;

said pressure sensor comprising a first semiconductor die and a second die, said second die bonded to said first die with said vacuum reference chamber located between said first die and said second die, said first die having a first side and a second side, said first side having a plurality of bonding pads;

means for holding said pressure sensor in a first position with said second side at said passageway while electrical connections are made between a plurality of said bonding pads and a plurality of said internal end portions; and a self contained drop of adhesive secured to said central portion of said cap for contacting said pressure sensor when said cap is complementarily received on said base, and moving said pressure sensor to a second position with said second side spaced from said pressure port as said drop of adhesive cures, with said pressure sensor then supported only by said drop of adhesive and said electrical connections.

11. Apparatus of claim 10 wherein said electrical connections are wire bonds.

12. Apparatus of claim 11 wherein said means for holding said pressure sensor in a first position with said second side at said pressure port comprises vacuum means.

13. Apparatus of claim 11 wherein said means for holding said pressure sensor in a first position with said second side at said pressure port comprises sublimeable adhesive means.

14. Apparatus for mounting an absolute pressure sensor having a self-contained vacuum reference within a housing, comprising:

said housing having a base and a cap and a pressure port, said cap for complimentary receipt on said base;

a plurality of conductive leads extending through said housing, said leads having a plurality of internal end portions;

said pressure sensor comprising a first semiconductor die and a second die, said second die bonded to said first die with said vacuum reference chamber formed between said first die and said second die, said first die having a first side and a second side, said first side having a plurality of electrical connection means;

a plurality of electrical interconnection means extending between said electrical connection means and said internal end portions, with said pressure sensor partially supported by said electrical interconnection means;

a self contained adhesive means secured at said cap and secured at said second die for maintaining said pressure sensor in a spaced relationship with said base.

15. Apparatus of claim 14 wherein said first semiconductor die is silicon and said second die is of a material that can be etched and has a thermal expansion characteristic closely matched to a thermal expansion characteristic of said silicon.

16. Apparatus of claim 15 wherein said second die material is selected from the group consisting of sapphire, ruby, silicon, Pyrex and glass.

\* \* \* \* \*